Feb. 4, 1964 J. BABOZ 3,120,064
OSCILLATORY DEVICES INTENDED MORE PARTICULARLY
FOR OPTICAL APPLIANCES
Filed July 6, 1961
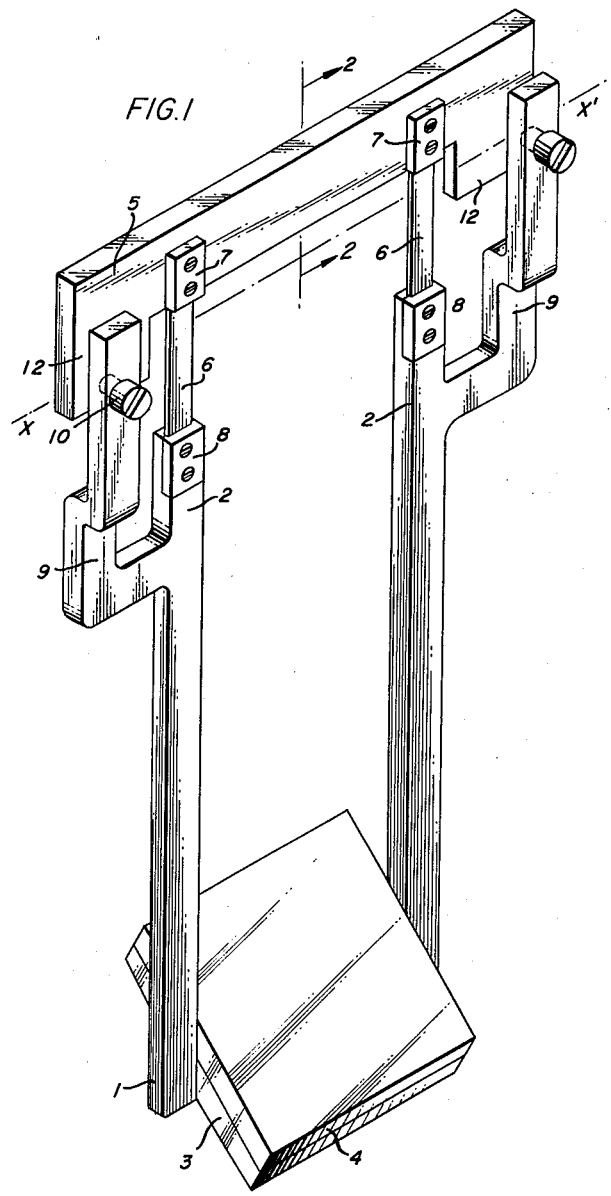
FIG./
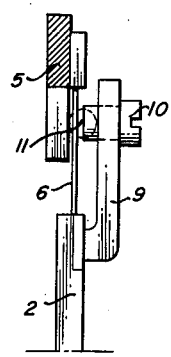
FIG.2
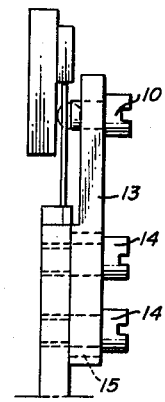
FIG.3
INVENTOR
JEAN BABOZ
BY
Cameron, Kerkam &Sutton
ATTORNEYS United States Patent Office 3,120,064
Patented Feb. 4, 1964

3,120,064
OSCILLATORY DEVICES INTENDED MORE PARTICULARLY FOR OPTICAL APPLIANCES
Jean Baboz, Paris, France, assignor to Societe d'Optique et de Mecanique de Haute Precision, Paris, France, a company of France
Filed July 6, 1961, Ser. No. 122,198
Claims priority, application France July 19, 1960
3 Claims. (Cl. 33—215)

The present invention relates to improvements in oscillatory devices intended more particularly for optical appliances.

In optical appliances which comprise a pendulum intended, for example, to ensure that a sighting line is horizontal and which for this purpose carry optical elements such as reversing mirrors or prisms, it is known that the sensitivity required of the pendulum is such that it cannot be suspended by means of pivots in the form of plain bearings or ball-races; this leads to the adoption of suspension by wires or flexible tapes linking the pendulum to its fixed support.

Such forms of suspension exhibit the disadvantage of not insulating the pendulum from oscillations other than those which it must be able to carry out about its horizontal axis of suspension; in particular, rotary movements about a more or less vertical axis occur, such movements being due, for example, to vibration, and having the effect of upsetting the accuracy of sighting, with the result that the image provided by the optical elements of the pendulum is never perfectly stabilised.

The improvements to which the invention relates have the purpose of producing an oscillatory device with suspension by flexible elements, wherein transverse stability is imparted to the pendulum without any alteration in its condition of balance with respect to its axis of suspension.

According to the invention, the pendulum, which is suspended from its fixed support by at least one flexible element such as a wire or metal tape, comprises two members bearing against the said fixed support and in line with the fictitious axis of articulation which is formed by the said flexible suspension elements, the said members being disposed on either side of the vertical median plane of the pendulum perpendicular to the said axis.

One particular form of embodiment of an oscillatory device according to the invention is illustrated in the appended drawing, and is described hereinafter.

In the drawing:

FIGURE 1 is a perspective overall diagrammatic view of a pendulum and its suspension.

FIGURE 2 is a partial view, sectioned along II—II in FIGURE 1, showing the articulation of the pendulum.

FIGURE 3 is a partial outline view, showing a variant of embodiment of the articulation of the pendulum.

The pendulum 1 illustrated by way of example in FIGURE 1 is made up of two uprights 2 joined at their lower end by a base-plate 3 to which an inclined reversing mirror 4 is fixed.

The pendulum 1 is suspended from a fixed cross-member 5 by means of two flexible strips 6, each fixed by means of two plates 7 and 8 to the cross-member 5 on the one hand and to one of the two uprights 2 on the other hand.

Each of the two uprights 2 of the pendulum carries an arm 9, laterally offset with respect to the strip 6 fixed to the upright, each arm having screwed into it a screw 10 whereof the end directed towards the cross-member 5 forms a recess for a ball 11 (FIGURE 2) intended to bear against a projection 12 on the cross-member 5. Each ball may be held in its recess by crimping.

The suspension by means of the two strips forms a fictitious axis of articulation X—X' whereof the position as regards height depends on the flexibility characteristics of the strips and the amplitude of the inclinations for which the sighting line must be made horizontal. The true position of this fictitious axis may be determined either by calculation or experimentally, and the two points against which the pendulum bears, formed by the two balls 11, must be disposed on the said axis of articulation.

This arrangement enables the pendulum freely to carry out oscillatory movements of limited amplitude about the axis X—X', but prevents the pendulum from carrying out any undesired movements about any fictitious axis whatever.

The variant of embodiment illustrated in FIGURE 3 enables the height of the two points at which the pendulum 1 bears against the cross-member 5 to be adjusted for maximum amplitude of the inclinations.

To this end, the screws 10 carrying the balls 11 are no longer mounted directly on the arms 9, but on slides 13 each fixed to the corresponding arm 9 by means of screws 14 passing through the slide via an oblong aperture 15. This solution enables the two bearing points to be brought on to the axis of articulation effectively formed by the two strips 6.

The oscillatory device in the form in which it has just been described might naturally have uses other than that which has been given by way of example.

Moreover, it could be modified in detail or supplemented by any useful accessory without for that reason departing from the scope of the invention.

Thus, in particular, the suspension may comprise only one flexible strip disposed between two bearing points, or on the contrary any number of strips; the bearing members, instead of being mounted on the pendulum, could be mounted on the fixed support of the pendulum, and the bearing members, instead of taking the form of balls providing bearing points, could take the form of knife-edges.

What I claim is:

1. In oscillatory devices for optical appliances, a pendulum, a fixed support for said pendulum, at least one flexible tape element suspending said pendulum from said support, a fictitious axis of articulation for said pendulum formed by said flexible tape element and two members bearing against said fixed support at spaced points along the fictitious axis of articulation of said pendulum, said members being disposed on either side of a vertical median plane of said pendulum, said plane being perpendicular to the fictitious axis of articulation of said pendulum.

2. An oscillatory wire device as described in claim 1, each of said members being a ball.

3. An oscillatory device as described in claim 1, the position of said two bearing members being adjustable along a vertical axis.

No references cited.